United States Patent [19] [11] Patent Number: 6,134,444
Kotzin [45] Date of Patent: Oct. 17, 2000

[54] METHOD AND APPARATUS FOR BALANCING UPLINK AND DOWNLINK TRANSMISSIONS IN A COMMUNICATION SYSTEM

[75] Inventor: Michael D. Kotzin, Buffalo Grove, Ill.

[73] Assignee: Motorola, Inc., Schaumburg, Ill.

[21] Appl. No.: 09/050,793

[22] Filed: Mar. 30, 1998

[51] Int. Cl.[7] .................................................. H04Q 7/20
[52] U.S. Cl. ........................... 455/453; 455/442; 455/423
[58] Field of Search .................................. 455/67.1, 453, 455/522, 423, 575, 442

[56] References Cited

U.S. PATENT DOCUMENTS

| 5,309,503 | 5/1994 | Bruckert et al. | 379/60 |
|---|---|---|---|
| 5,475,870 | 12/1995 | Weaver, Jr. et al. | 455/67.1 |
| 5,548,812 | 8/1996 | Padovani et al. | 455/33.2 |
| 5,574,974 | 11/1996 | Almgren et al. | 455/33.1 |
| 5,884,187 | 3/1999 | Ziv et al. | 455/522 |
| 5,960,353 | 9/1999 | Lee | 455/453 |
| 6,009,328 | 12/1999 | Muszynski | 455/442 |

Primary Examiner—Daniel S. Hunter
Assistant Examiner—C. Chow
Attorney, Agent, or Firm—Richard A. Sonnentag; R. Louis Breeden

[57] ABSTRACT

A method and apparatus for balancing uplink and downlink signal transmissions in a code-division multiple access (CDMA) communication system (100) is disclosed. In the preferred embodiment, a system level change is performed (303) and parameters related to the uplink (107) and downlink (108) transmissions are analyzed (306). The uplink (107) and downlink (108) transmissions are balanced (309) by, inter alia, increasing or decreasing the downlink transmission power at a base-station (101, 106), systematically adding loss or noise to a receiver located at a base-station (101, 106) or both.

4 Claims, 3 Drawing Sheets

METHOD AND APPARATUS FOR BALANCING UPLINK AND DOWNLINK TRANSMISSIONS IN A COMMUNICATION SYSTEM

FIELD OF THE INVENTION

The present invention relates, in general, to communication systems and, more particularly, to balancing uplink and downlink transmissions in such communication systems.

BACKGROUND OF THE INVENTION

Code-division multiple access (CDMA) communication systems are well known. One exemplary CDMA communication system is the so-called IS-95A which is defined for use by in North America by the Telecommunications Industry Association (TIA). For more information on IS-95A, see TIA/EIA/IS-95-A, *Mobile Station-Base-station Compatibility Standard for Dual Mode Wideband Spread Spectrum Cellular System,* March 1995, published by the Electronic Industries Association (EIA), 2001 Eye Street, N.W., Washington, D.C. 20006. Soft handoff in CDMA communication systems such as IS-95A is a well known technique to improve the capacity of such a CDMA communication system. When in soft handoff, simultaneous up-and downlinks are created between a subscriber unit and two or more cell sites.

Prior to initiating a soft handoff, a mobile station in communication with a source base-station determines the detection quality of a downlink (base-station to mobile station) transmission not only from the source base-station but also candidate target base-stations. The downlink transmission received and analyzed by the mobile station from the various base-stations is called the pilot channel. Generally stated, if the mobile station determines that the signal strength of the pilot channel transmitted by a target base-station exceeds a particular threshold or detection criteria, the mobile station will signal measurement data to the infrastructure, which in turn will send messages back to the subscriber to initiate a soft handoff. However, conditions associated with the transmission environment and setting of equipment parameters, create imbalance between the uplink and downlink signals. Since downlink measurements dictate when soft handoff is established, it may either be late or premature for optimizing communication in the uplink. Therefore, communication to the mobile station and the performance of the CDMA communication system as a whole may not actually benefit from being in soft handoff.

Thus, a need exists for an improved method and apparatus which overcomes the deficiencies of the prior art.

DETAILED DESCRIPTION OF THE PREFERRED EMBODIMENT

A method and apparatus for balancing uplink and downlink signal transmissions in a code-division multiple access (CDMA) communication system is disclosed. In the preferred embodiment, a system level change is performed and parameters related to the uplink and downlink transmissions are analyzed. The uplink and downlink transmissions are balanced by, inter alia, increasing or decreasing the downlink transmission power at a base-station, systematically adding loss or noise to a receiver located at a base-station or both.

Stated more specifically, a method of balancing uplink and downlink transmissions in a communication system includes the steps of performing a system level change and analyzing system parameters related to an uplink transmission by a mobile station and downlink transmissions to the mobile station after the system level change. Based on the analysis of the system parameters, the uplink transmission and downlink transmissions are balanced accordingly. In the preferred embodiment, the communication system is a code-division multiple access (CDMA) communication system and the system parameters include Eb/No measurements of the uplink and downlink transmissions by the mobile station. Also in the preferred embodiment, the system level change further comprises initiation of a soft handoff and the balancing of the uplink transmission and downlink transmissions is accomplished by adjusting the down link transmission power of a base-station in soft handoff with the mobile station or adding loss or noise to a receiver within a base-station in soft handoff with the mobile station. A corresponding apparatus, which could be either base-station in soft handoff with the mobile station, performs the above steps.

In an alternate embodiment, a method of controlling a mobile station in soft handoff with a plurality of base-stations includes the steps of determining, based on a measurement of a downlink transmission pilot signal, that the soft handoff condition should be terminated and determining that a reception benefit is being realized in an uplink transmission. The method then suspends termination of the soft handoff until the reception benefit of the uplink transmission disappears.

Figure 1:
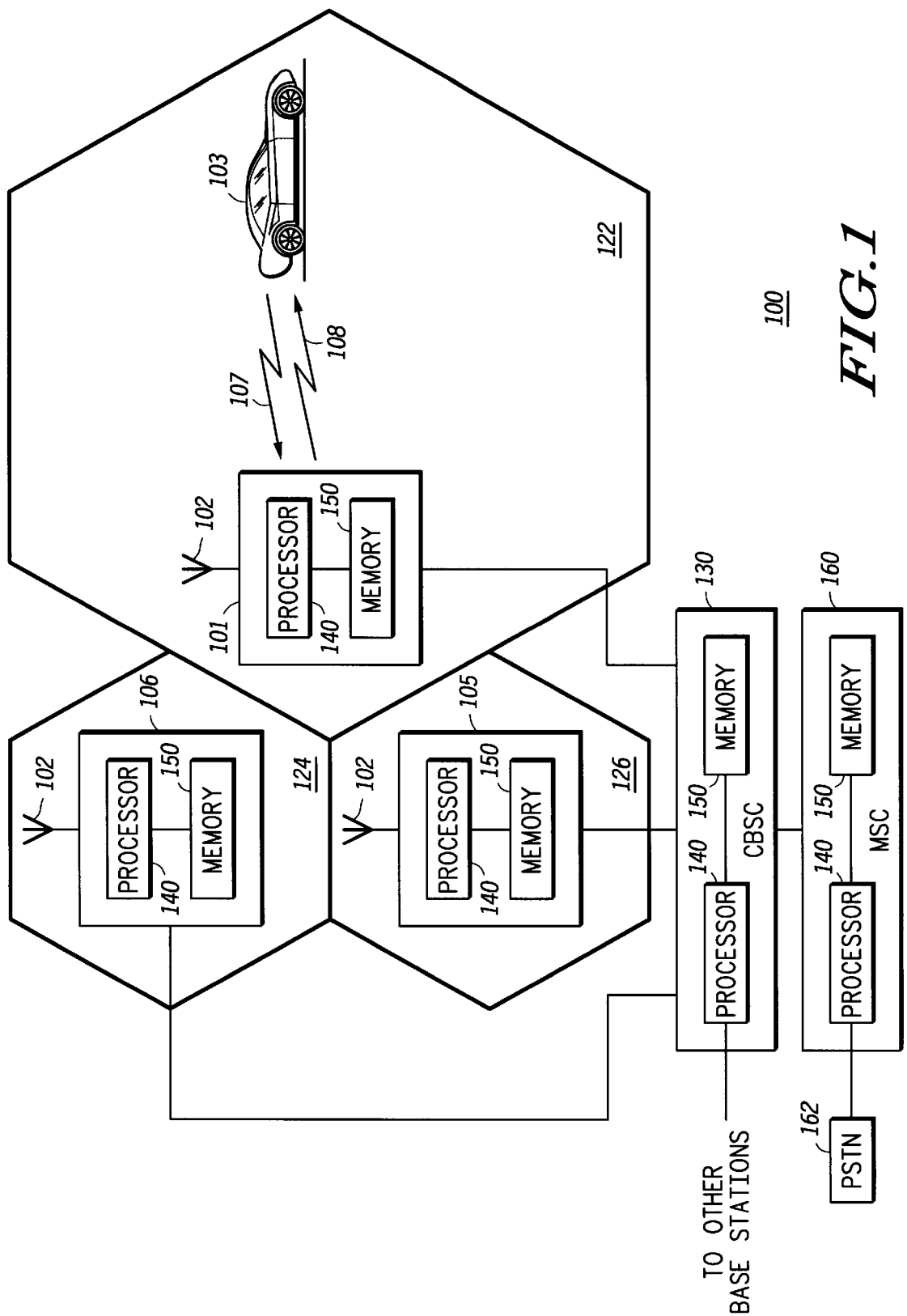
FIG. 1 generally depicts a CDMA communication system having unbalanced uplink and downlink transmissions.

Referring now to FIG. 1, a CDMA communication system is depicted. As shown in FIG. 1, a source base-station 101 located in a first coverage area 122 communicates with a mobile station 103 via a digital radio channel, which includes an uplink transmission 107 and a downlink transmission 108, and also contains information compatible with the CDMA communication system 100 as defined by the above-mentioned IS-95A. Mobile station 103 maintains communication with the source base-station 101 until mobile station 103 nears the second coverage area 124. As shown in FIG. 1, each base-station 101, 105, 106 include, inter alia, an antenna 102, a processor 140 and memory 150 as is well known in the art. For more information on the operation of base-stations 101, 105, 106, reference is made to the book titled "*Introduction to Spread-Spectrum Communications*" by Peterson et al., published by Prentice-Hall in the United States, 1995, and incorporated herein by reference.

Coupled to each of base-stations 101, 105, 106 is a centralized base-station controller (CBSC) 130. CBSC 130 is itself coupled to other base-stations (not shown for clarity) and a mobile switching center (MSC) 160. Each of the CBSC 130 and the MSC 160 also include, inter alia, a processor 140 and memory 150. The MSC 160 is coupled to the public switched telephone network (PSTN) 162 which supports standard wireline communications as is known in the art.

As mobile station 103 nears the second coverage area 124, a cellular handoff from the source base-station 101 to a target base-station 106 becomes necessary. In CDMA communications systems compatible with IS-95A, "soft handoff" is supported as stated above and is initiated. When mobile station 103 determines that a signal transmitted by second base-station 106 is adequate, measurement reports are sent to base-station 101 which are passed to CBSC 130. CBSC 130 sends appropriate messages via base-station 101 to mobile station 103 to initiate the soft handoff. Base-stations 101 and 106 are also so notified via CBSC 130. Communication to mobile station 103 from both base-stations 101 and 106 is initiated. During soft handoff, target base-station 106 begins transmitting information to mobile station 103 with appropriate transmission coding, and mobile station 103 detects information transmission from both base-stations 101 and 106. The uplink signal, transmitted by mobile station 103, is received at both base-stations 101 and 106. A selector in CBSC 130 (not shown) selects the best decoded signal from both base-stations 101 and 106. Power control, based on this dual reception is beneficially utilized to minimize the subscriber's transmitted power. This serves to reduce interference and maximize system capacity. At some point, again based on detection thresholds of the pilot channel transmissions and appropriate messaging of measurements and control messages, the communication from source base-station 101 to mobile station 103 is terminated, and target base-station 106 assumes the communication responsibilities. The handoff is termed "soft handoff" because, from the perspective of mobile station 103, no break in communication has occurred.

Figure 2:
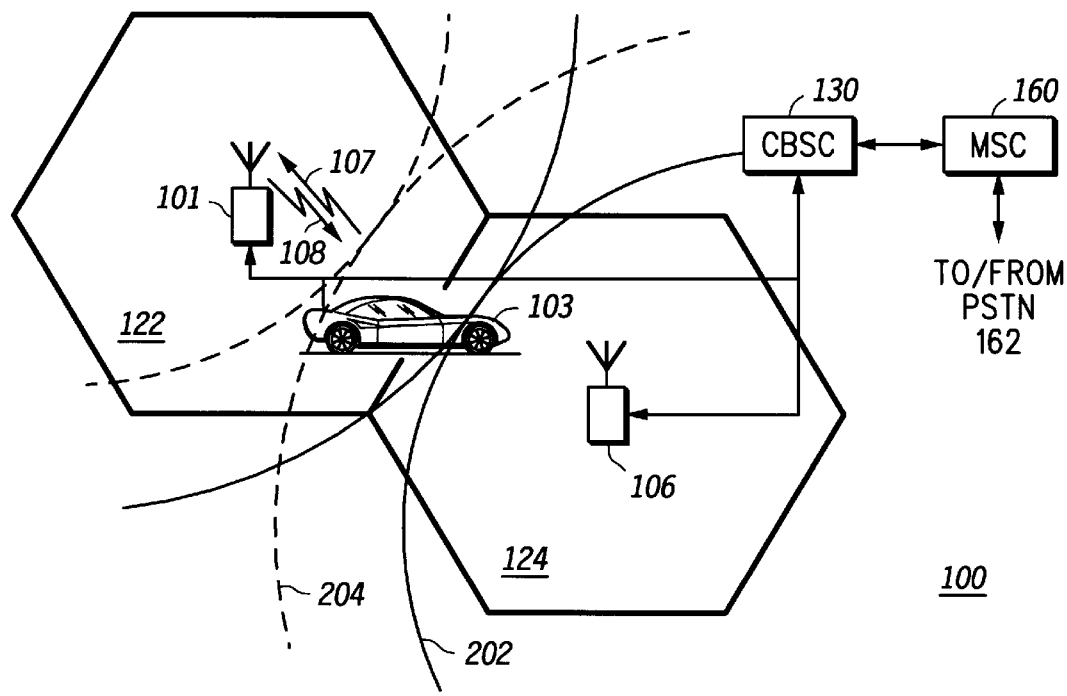
FIG. 2 generally depicts a CDMA communication system having unbalanced uplink and downlink transmissions.

As stated above, conditions associated with the transmission environment may be such that the mobile station (and the performance of the CDMA communication system overall) may not benefit from being in soft handoff. Specifically, an imbalance between uplink (107) and downlink (108) transmissions can impair the effectiveness of soft handoff. FIG. 2 depicts unbalanced uplink and downlink boundaries which may occur during soft handoff. As shown in FIG. 2, downlink boundary 202 represents the boundary where the mobile station 103 receives the pilot channel transmissions from both source base-station 101 and target base-station 106 equally. However, as also shown in FIG. 2, downlink boundary 202 does not coincide with uplink boundary 204 (distinguished as a dotted line boundary) which represents the boundary where a transmission by mobile station 103 is received equally at both source base-station 101 and target base-station 106. In this case, since soft handoff is only controlled using downlink measurements taken by mobile station 103, the uplink transmission by mobile station 103 will be received unnecessarily high by target base-station 106 just prior to when soft handoff is initiated. Since CDMA communication system 100 is an interference limited system, the over transmission by mobile station 103 just prior to soft handoff will only increase the amount of interference as seen by target base-station 106 reducing its coverage and capacity benefits due to the presence of the excess noise.

Figure 3:
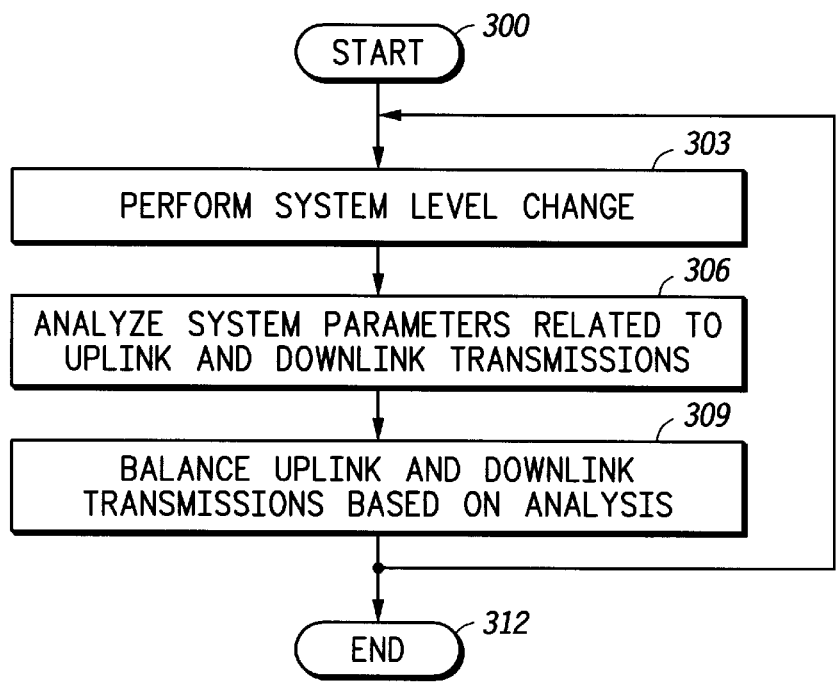
FIG. 3 generally depicts a flow chart implemented for balancing uplink and downlink transmissions in accordance with the invention.

In accordance with the invention, FIG. 3 depicts a flow chart implemented for balancing uplink (107) and downlink (108) transmissions in the preferred embodiment. As shown in FIG. 3, the balancing process starts at step 300 and proceeds to step 303 where a system level change is performed. In the preferred embodiment, the system level change is the initiation of soft handoff by base-stations 101 and 106 with mobile station 106 as described above. At step 306, system parameters related to the uplink transmission of mobile station 103 and the downlink transmission of the base-stations 101 and 106 are analyzed. In the preferred embodiment, the uplink transmission of mobile station 103 is analyzed by the base-stations 101 and 106 by determining respective signal detection at each base-station 101 and 106 of the uplink transmission of mobile station 103. If, immediately after the initiation of soft handoff, it is observed that uplink communication with the target cell is significantly better than the source cell—for example by detecting a rapid shift in frame erasure rate in the selector, or Eb/No measurement in the source and target receivers (caused by power control being dominated by the target taking effect) it can be presumed that the uplink and downlink are not in balance and an adjustment should be made.

In accordance with the invention, uplink (107) and downlink (108) transmissions are balanced at step 309 based on the analysis of the system parameters. In the preferred embodiment, the uplink (107) and downlink (108) transmissions are balanced by either increasing the downlink transmission power at base-station 106, decreasing the downlink transmission power at base-station 101, systematically adding loss or noise to the receiver located at base-station 106 or both. Adding loss or noise to the receiver adjusts the effective noise figure of the receiver at the base-station 106. One skilled in the art will realize that many other parameters could be analyzed to beneficially affect the balance of uplink and downlink transmission in accordance with the invention.

Figure 4:
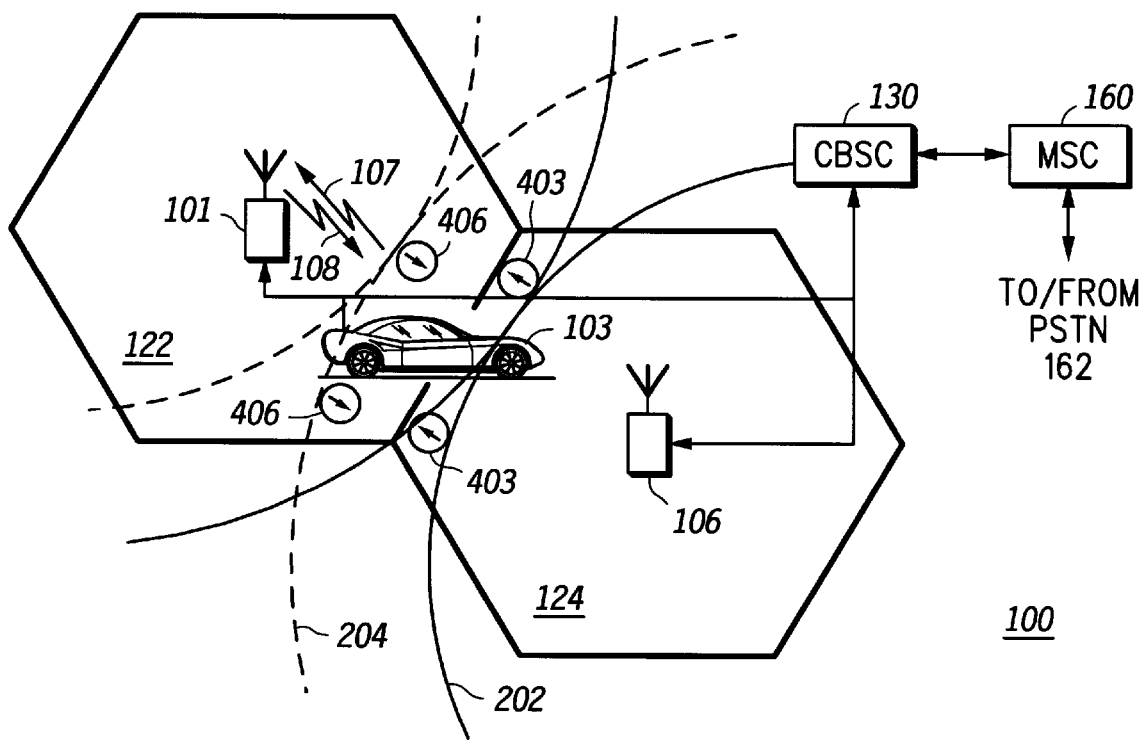
FIG. 4 depicts the effects on an uplink boundary and a downlink boundary in accordance with the invention.

The effect of the balancing step 309 is shown in FIG. 4, which depicts the effects on uplink boundary 204 and downlink boundary 202 in accordance with the invention. Referring to FIG. 4, when the downlink transmission power at base-station 106 is increased or downlink transmission power at base-station 101 is decreased, the downlink boundary 202 moves toward the uplink boundary 204 as shown by arrows 403. Likewise, when loss or noise is systematically added to the receiver located at base-station 106, the net effect is that the receiver located at base-station 106 is less capable of receiving the uplink transmission from mobile station 103, which moves the uplink boundary 202 toward the downlink boundary 204 as shown by arrows 406. In either event, balancing the uplink (107) and downlink (108) transmissions in accordance with the invention allows the maximum system benefits afforded by soft handoff to be achieved in accordance with the invention.

Other system level changes could be used to initiate an uplink and downlink transmission balance. For example, upon execution of a handoff command to remove mobile station 103 from soft handoff, another uplink and downlink transmission balance could be executed. In this scenario, both base-station 101 and 106 could receive the uplink transmission from mobile station 103 equally well while the soft handoff control process, based solely on measurements of the downlink base-station pilot signals, would normally demand that the soft handoff condition be terminated. Clearly, the uplink (107) and downlink (108) transmissions are unbalanced and a balance is necessary. In this case, the system 100 suspends the termination of soft handoff temporarily while the benefit to uplink transmission (107) due to soft handoff is being realized. Stated differently, the termination of soft handoff is temporarily suspended until the benefit to uplink transmission (107) due to soft handoff disappears.

It is understood that system parameter changes would likely be done within certain bounds or limits predetermined by the system designer. Small changes would help to maintain overall system stability and to ensure uniformity amongst the plurality of the cell system is maintained.

It is well known that uplink and downlink balance variability with loading of the CDMA communication system may occur. The aforementioned technique, operating on the continuous motion of numerous subscribers, would allow for system adjustment to compensate for these naturally occurring load variabilities. Additionally, the method of detecting an imbalance between uplink (107) and downlink (108) transmissions could also be exploited to indicate problems which exists within the CDMA communication system. For example, if downlink transmission power or receiver sensitivity drift occurs, or a fault occurs in a receiver/transmitter branch, etc., the analysis step 306 could be used to determine the resulting imbalance between uplink (107) and downlink (108) transmissions.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of controlling a mobile station in soft handoff with a plurality of base-stations, the method comprising the steps of:

determining, based on a measurement of a downlink transmission pilot signal, that the soft handoff condition should be terminated;

determining that a reception benefit to uplink transmission due to the soft handoff is being realized; and suspending termination of the soft handoff until the reception benefit to the uplink transmission disappears.

2. The method of claim 1, wherein the step of determining that the reception benefit is being realized comprises the step of determining that first and second base-stations in soft handoff with the mobile station are receiving the uplink transmission from the mobile station equally well.

3. Apparatus for controlling a mobile station in soft handoff with a plurality of base stations, the apparatus comprising:

means for determining, based on a measurement of a downlink transmission pilot signal, that the soft handoff condition should be terminated;

means for determining that a reception benefit to uplink transmission due to the soft handoff is being realized; and means for suspending termination of the soft handoff until the reception benefit to the uplink transmission disappears.

4. The apparatus of claim 3, wherein the means for determining that a reception benefit is being realized comprises a means for determining that first and second base-stations in soft handoff with the mobile station are receiving the uplink transmission from the mobile station equally well.

* * * * *